United States Patent
Tiger et al.

(10) Patent No.: US 9,559,868 B2
(45) Date of Patent: Jan. 31, 2017

(54) APPARATUS AND METHODS FOR BANDWIDTH SAVING AND ON-DEMAND DATA DELIVERY FOR A MOBILE DEVICE

(75) Inventors: Roi Tiger, Tel Aviv (IL); Guy Rosen, Givatayim (IL); Yuval Ariav, Binyamina (IL)

(73) Assignee: ONAVO MOBILE LTD., Menlo Park, CA (US)

( * ) Notice: Subject to any disclaimer, the term of this patent is extended or adjusted under 35 U.S.C. 154(b) by 896 days.

(21) Appl. No.: 13/173,619

(22) Filed: Jun. 30, 2011

(65) Prior Publication Data

US 2012/0254327 A1    Oct. 4, 2012

Related U.S. Application Data

(60) Provisional application No. 61/470,549, filed on Apr. 1, 2011.

(51) Int. Cl.
*G06F 15/16* (2006.01)
*H04L 12/58* (2006.01)
*H04W 4/18* (2009.01)

(52) U.S. Cl.
CPC ............ *H04L 12/5895* (2013.01); *H04W 4/18* (2013.01)

(58) Field of Classification Search
USPC .......... 709/206, 203, 224; 707/621; 713/150
See application file for complete search history.

(56) References Cited

U.S. PATENT DOCUMENTS

| | | | |
|---|---|---|---|
| 5,935,212 A | 8/1999 | Kalajan et al. | |
| 6,366,947 B1 | 4/2002 | Kavner | |
| 6,697,839 B2 | 2/2004 | Sini et al. | |
| 7,031,940 B2 | 4/2006 | Shigemi et al. | |
| 7,051,075 B1 | 5/2006 | Machino et al. | |
| 7,136,920 B2 | 11/2006 | Castell et al. | |
| 7,155,519 B2 | 12/2006 | Lo et al. | |
| 7,185,063 B1 | 2/2007 | Kasriel et al. | |
| 7,277,915 B2 | 10/2007 | De Boor et al. | |
| 7,376,740 B1 | 5/2008 | Porter et al. | |
| 7,444,506 B1 | 10/2008 | Datta et al. | |
| 7,596,600 B2 | 9/2009 | Quine et al. | |
| 7,624,151 B2 | 11/2009 | Heidloff et al. | |
| 7,747,691 B2 | 6/2010 | Castell et al. | |

(Continued)

OTHER PUBLICATIONS

Microsoft Corporation, "ActiveSync Document Class Protocol Specification"; [MS-ASDOC]—v20110315, released Mar. 15, 2011.

(Continued)

*Primary Examiner* — Tammy Nguyen
(74) *Attorney, Agent, or Firm* — Kacvinsky Daisak Bluni PLLC

(57) ABSTRACT

A method for reducing data bandwidth usage in wireless communication comprises receiving a request from the a mobile device to provide the an e-mail message; sending a request to the an e-mail server for delivery of the e-mail message; analyzing the e-mail message delivered from the e-mail server to determine if a size of the e-mail message is above a threshold value, and if not expanding the e-mail content to be above the threshold value; acknowledging to the mobile device the existence of the e-mail message and its respective size; and delivering to the mobile device header content of the e-mail content, thereby only a small fraction of the data corresponding to the e-mail message is actually delivered to the mobile device.

7 Claims, 3 Drawing Sheets

(56) References Cited

U.S. PATENT DOCUMENTS

| | | |
|---|---|---|
| 7,752,292 B1 | 7/2010 | Katzer |
| 7,756,929 B1 | 7/2010 | Pettigrew et al. |
| 7,831,667 B2 | 11/2010 | Gleeson et al. |
| 7,873,074 B1 | 1/2011 | Boland |
| 7,877,452 B2 | 1/2011 | Yeh et al. |
| 7,899,847 B2 | 3/2011 | Lau et al. |
| 7,908,383 B2 | 3/2011 | Porter et al. |
| 7,966,387 B1 | 6/2011 | Katzer |
| 8,005,891 B2* | 8/2011 | Knowles ........... G06F 17/30902 709/203 |
| 8,006,224 B2 | 8/2011 | Bateman et al. |
| 8,006,283 B2 | 8/2011 | Reiher |
| 8,099,113 B2 | 1/2012 | Morrison |
| 8,169,916 B1* | 5/2012 | Pai et al. ...................... 370/238 |
| 8,185,591 B1* | 5/2012 | Lewis ........................... 709/206 |
| 8,185,607 B1 | 5/2012 | Arzur et al. |
| 8,275,356 B2* | 9/2012 | Hickie .......................... 455/410 |
| 8,510,472 B1 | 8/2013 | Anderson et al. |
| 8,615,549 B2* | 12/2013 | Knowles ........... G06F 17/30902 709/203 |
| 8,745,373 B2 | 6/2014 | Molsberry et al. |
| 2002/0038429 A1 | 3/2002 | Smeets |
| 2002/0162024 A1 | 10/2002 | Cunchon et al. |
| 2004/0098306 A1* | 5/2004 | Fitzpatrick et al. ............ 705/14 |
| 2004/0116117 A1 | 6/2004 | Ahvonen et al. |
| 2005/0108020 A1 | 5/2005 | Lehavi |
| 2005/0281233 A1 | 12/2005 | Parker |
| 2006/0031325 A1 | 2/2006 | Cheng |
| 2006/0200738 A1 | 9/2006 | Tarle et al. |
| 2006/0215936 A1* | 9/2006 | Dorfman et al. ............. 382/306 |
| 2006/0258341 A1 | 11/2006 | Miller et al. |
| 2007/0043940 A1 | 2/2007 | Gustave et al. |
| 2007/0073720 A1* | 3/2007 | Clarke .................... G06F 9/546 |
| 2007/0174490 A1 | 7/2007 | Choi et al. |
| 2007/0177575 A1 | 8/2007 | Osenbach et al. |
| 2007/0198634 A1* | 8/2007 | Knowles ........... G06F 17/30902 709/203 |
| 2007/0259676 A1 | 11/2007 | Golla |
| 2008/0313039 A1* | 12/2008 | Altberg et al. ................. 705/14 |
| 2008/0320151 A1 | 12/2008 | McCanne et al. |
| 2008/0320154 A1 | 12/2008 | Demmer et al. |
| 2009/0106110 A1 | 4/2009 | Stannard et al. |
| 2009/0138547 A1* | 5/2009 | Boudreau ..................... 709/203 |
| 2009/0150498 A1 | 6/2009 | Branda et al. |
| 2009/0157888 A1 | 6/2009 | Demmer et al. |
| 2009/0248670 A1 | 10/2009 | Fiatal |
| 2009/0327695 A1 | 12/2009 | Molsberry et al. |
| 2010/0011075 A1* | 1/2010 | Klassen et al. ............... 709/206 |
| 2010/0037130 A1 | 2/2010 | Jakubowski |
| 2010/0088380 A1 | 4/2010 | Starbuck et al. |
| 2010/0095021 A1 | 4/2010 | Samuels et al. |
| 2010/0153434 A1 | 6/2010 | Erickson et al. |
| 2010/0169787 A1 | 7/2010 | Boskovic |
| 2010/0228737 A1 | 9/2010 | Riemers |
| 2010/0250768 A1 | 9/2010 | Barreto et al. |
| 2010/0251143 A1 | 9/2010 | Thomas et al. |
| 2010/0303053 A1 | 12/2010 | Akbari et al. |
| 2011/0055343 A1 | 3/2011 | Gleeson et al. |
| 2011/0099612 A1 | 4/2011 | Lee et al. |
| 2011/0138154 A1 | 6/2011 | Tevis et al. |
| 2011/0231517 A1 | 9/2011 | Srinivasan et al. |
| 2011/0264731 A1* | 10/2011 | Knowles ........... G06F 17/30902 709/203 |
| 2012/0023226 A1* | 1/2012 | Petersen ............... H04W 4/028 709/224 |
| 2012/0077526 A1* | 3/2012 | Riffe ............................ 455/466 |
| 2012/0101952 A1 | 4/2012 | Raleigh et al. |
| 2012/0158947 A1 | 6/2012 | Hassan et al. |
| 2012/0226760 A1* | 9/2012 | Lewis ........................... 709/206 |
| 2012/0254285 A1 | 10/2012 | Tiger et al. |
| 2013/0097333 A1* | 4/2013 | Bathurst ........... H04L 29/06027 709/231 |
| 2013/0212200 A1* | 8/2013 | Dennis et al. ................ 709/206 |
| 2013/0215116 A1* | 8/2013 | Siddique et al. ............. 345/420 |
| 2013/0232216 A1 | 9/2013 | Tiger et al. |
| 2014/0006347 A1* | 1/2014 | Qureshi .................. G06F 21/10 707/621 |
| 2014/0006772 A1* | 1/2014 | Qureshi .................. G06F 21/10 713/150 |
| 2015/0339466 A1 | 11/2015 | Gao et al. |

OTHER PUBLICATIONS

Combs et al., "Have one application use VPN while others do not in Linux?", <http://serverfault.com/questions/56597/have-one-application-use-vpn-while-others-do-not-in-linux>, Aug. 20, 2009, 4 pages.

Murphy, Mark, "TrafficMonitorActivity.java", <https://github.com/commonsguy/cw-andtuning/blob/master/TrafficMonitor/src/com/commonsware/andold/tuning/traffic/TrafficMonitorActivity.java>, Aug. 19, 2011, 117 lines.

Murphy, Mark, "TrafficRecord.java", <https://github.com/commonsguy/cw-andtuning/blob/master/TrafficMonitor/src/com/commonsware/andold/tuning/traffic/TrafficRecord.java>, Aug. 19, 2011, 34 lines.

Murphy, Mark, "TrafficSnapshot.java", <https://github.com/commonsguy/cw-andtuning/blob/master/TrafficMonitor/src/com/commonsware/andold/tuning/traffic/TrafficSnapshot.java>, Aug. 19, 2011, 32 lines.

"Monetizing the Mobile Internet", Published by Cisco, Jul. 2010, 7 pages (author unknown).

"Microsoft Computer Dictionary", Microsoft Press, 5th ed. Mar. 15, 2002, pp. 241-242 (author unknown).

* cited by examiner

APPARATUS AND METHODS FOR BANDWIDTH SAVING AND ON-DEMAND DATA DELIVERY FOR A MOBILE DEVICE

CROSS-REFERENCE TO RELATED APPLICATIONS

This application claims the benefit of U.S. provisional application No. 61/470,549 filed on Apr. 1, 2011, the contents of which are herein incorporated by reference.

TECHNICAL FIELD

The invention generally relates to data transfers into an application executing on a mobile device, and more specifically to providing data to a mobile device, for example, to an electronic mail application of a mobile device.

BACKGROUND OF THE INVENTION

The use of mobile devices in general, and smartphones as well as tablet computers in particular, such as Apple's iPAD®, Apple's iPhone®, and Google's Android based smartphones and tablet computers, is increasing significantly. These mobile devices have become in many cases a primary replacement to other computing devices allowing access to data by the mobile device to a variety of applications in general, and in particular to electronic mail (e-mail) applications. The receipt of data by the mobile device typically requires the use of wireless bandwidth. Mobile devices typically utilize wireless bandwidth through a wireless local area network (WLAN) or the cellular network. The data connectivity through the cellular network, unlike the wired and WLAN counterpart, tends to be pricey, especially when the user is outside of the boundaries of a given data pricing package.

Standard ways to reduce the amounts of data sent to and from the mobile device include a plurality of well-known compression techniques. However, such techniques are limited and further data reduction may be required. This is particularly true with respect to data provided by e-mail applications where it has become customary to attach documents, pictures, video clips, and the like which increase significantly the size of an e-mail message. In many cases, the user does not desire to receive all this data. A common technique to reduce the amount of data is not to send an e-mail message that is over a particular size to the mobile device, but to instead send only certain portions thereof, and allow the user to request the download of the rest of the e-mail message on-demand. The threshold is typically a built-in function on the mobile application and therefore operates automatically, providing certain additional bandwidth savings.

An exemplary protocol that is now widely used for the purpose of such synchronization of a mobile device is the Microsoft ActiveSync® standard. However, this standard does not define the kinds of compression or handling of data to reduce the amount of data provided to the mobile device. This decision is typically built-in by the application in general, and the e-mail application in particular executed over the mobile device. In a typical application, such as the e-mail on Apple's iPhone, two separate types of decisions are made by the e-mail application. One has to do with the size of the text in rich or simple format and the other with handling attachments to the e-mail. The decision is made on a per e-mail basis, and therefore it is often the case that unwanted data is automatically downloaded to the mobile device, increasing the use cost unnecessarily.

It would be advantageous to provide a solution that overcomes the limitations of currently available applications for mobile devices. It would be further advantageous if the solution would not require the use of a dedicated client running on the mobile device.

SUMMARY OF THE INVENTION

Certain embodiments disclosed herein a method for reducing data bandwidth usage in wireless communication. The method includes receiving a request from the a mobile device to provide the an e-mail message; sending a request to the an e-mail server for delivery of the e-mail message; analyzing the e-mail message delivered from the e-mail server to determine if a size of the e-mail message is above a threshold value, and if not expanding the e-mail content to be above the threshold value; acknowledging to the mobile device the existence of the e-mail message and its respective size; and delivering to the mobile device header content of the e-mail content, thereby only a small fraction of the data corresponding to the e-mail message is actually delivered to the mobile device.

Certain embodiments disclosed herein also include a network component adapted for reducing data bandwidth usage in wireless communication. The network component comprises an interface to a network for communicating with at least an e-mail server and to at least one mobile device, wherein the network component is in a path between the at least e-mail server and the at least one mobile device; and a processing unit for processing a request from the at least one mobile device to the at least e-mail server and causing each e-mail message received by the network component from the at least e-mail server to be viewed by the at least one mobile device as being of a size that is above a threshold value of the at least one mobile device, thereby providing to the at least one mobile device only preview information of each received e-mail message, thereby enabling a user of the at least one mobile device to determine whether to download the each received e-mail message to the at least one mobile device.

Certain embodiments disclosed herein further include a network component adapted for reducing data bandwidth usage in wireless communication. The network component comprises an interface to a network for communicating with at least an e-mail server and to at least one mobile device; and a processing unit for processing a request from the at least one mobile device to the at least e-mail server and causing an e-mail message received from the at least e-mail server containing an attachment that can be reduced in quality to be sent to the at least one mobile device in a reduced quality while causing the at least e-mail server to recognize the received e-mail as a candidate for any one of a smart reply and a smart forward.

Certain embodiments disclosed herein further a method for reducing data bandwidth usage in wireless communication. The method comprises receiving a request from the a mobile device to provide an e-mail message; sending a request to the an e-mail server for delivery of the e-mail message; analyzing the e-mail message delivered from the e-mail server to determine if the e-mail message includes an attachment that can be reduced in quality when sent to the mobile device; reducing the quality of the attachment; and delivering to the mobile device the reduced quality attachment.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
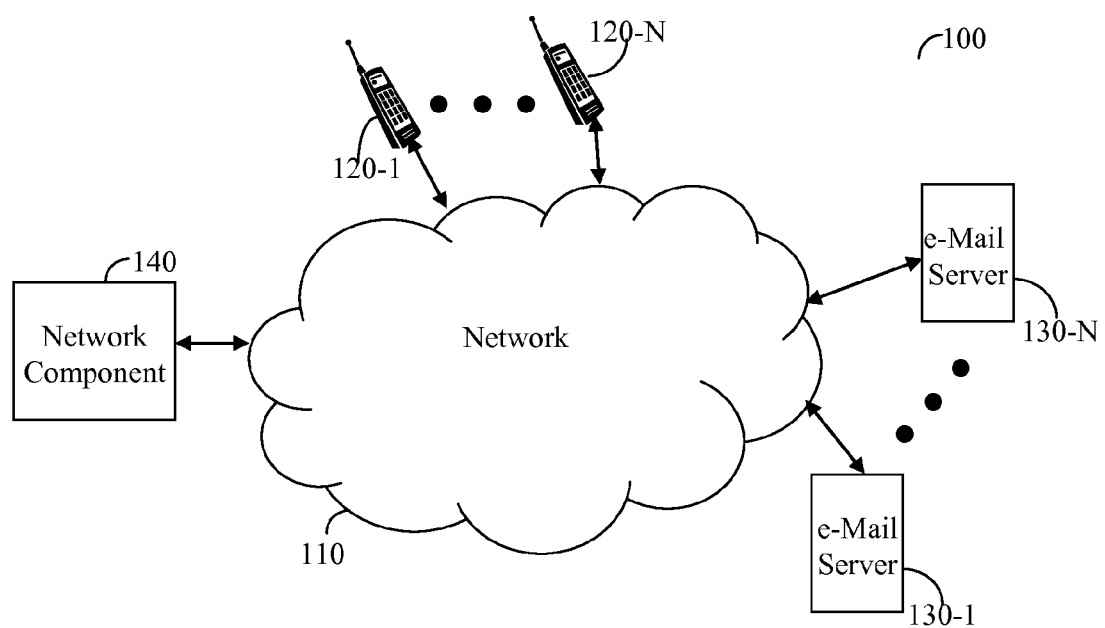
FIG. 1 is a system operative in accordance with certain embodiments of the invention.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Viewing of e-mail messages (also referred to as e-mails or e-mail) on mobile devices, such as smartphones, is becoming a primary tool for persons on the go for receiving data in general and e-mail in particular. However, e-mails today with their rich text and file attachments can be large consumers of allocated bandwidth that translates to significant costs. According to certain embodiments of the invention, a network component is used to temporarily increase e-mails smaller than a threshold size, thereby avoiding their automatic download to the mobile device. In the case of rich content attachment files, such as photographs and video clips, resolution reduction and/or additional compression is also suggested while storing the original content on the network component to ensure that forwarding of the files by the client retains the original quality by using the original rather than the reduced content residing on the mobile device. Other applications (e.g., a smartphone application or a native application), operable on mobile devices and which also download content over the cellular network, may also benefit from the teachings disclosed herein.

FIG. 1 depicts an exemplary and non-limiting system 100 operative in accordance with an embodiment of the invention. A network 110 is a network that enables communication between one or more mobile devices 120-1 through 120-N. The mobile devices can be, but are not limited to, smartphones, tablet computers, netbook computers, and laptop computers. Smartphones and tablet computers are capable of running multitask applications that are native to the underlying hardware. Smartphones and tablet computers run complete operating system software providing a platform for application developers. Examples for such devices may include Apple's iPhone®, Apple's iPAD® as well as Google's Android based smartphones, and tablet computers. The mobile device 120 communicates wirelessly with the network 110 among others for the purpose of communication with the e-mail servers 130-1 through 130-M. All the mobile devices 120 are capable of receiving and transmitting data from a cellular network. As mentioned above, such capabilities require purchase of a data plan, from the network provider, such that its price is a function of the consumed data bandwidth from the cellular network. Thus, the network 110 may be any combination of one or more cellular networks, a wide area network (WAN), and the Internet.

A mobile device, for example, mobile device 120-$i$ (where $i=1 \ldots N$), can communicate with one or more e-mail servers 130-1 through 130-M as a user may have more than one e-mail account, each e-mail account being served by a different e-mail server 130. For example, a user of a mobile device 120-1 runs an e-mail application to access a Gmail® account for his personal e-mails and a Microsoft Exchange® account to access his work e-mails.

According to an embodiment of the invention, there is made use of a network component 140 such that transactions between the mobile device 120-$i$ to its respective one or more e-mail servers 130 are captured in fact by the network component 140. The network component 140 communicates with the e-mail servers 130 on behalf of the mobile device 120-$i$. The network component 140 may be, but is not limited to, a proxy server, a local proxy server, a virtual private network (VPN) server, a traffic shaper, a router, a network address translator (NAT), and the like, that are operative between a client, i.e., a mobile device 120, and an e-mail server 130. The network component 140 is enabled to perform a variety of tasks as explained in more detail herein below that cause the wireless communication between the mobile device 120-$i$ to consume less bandwidth, thereby reducing the costs associated with the operation of the mobile device 120-$i$.

Figure 2:
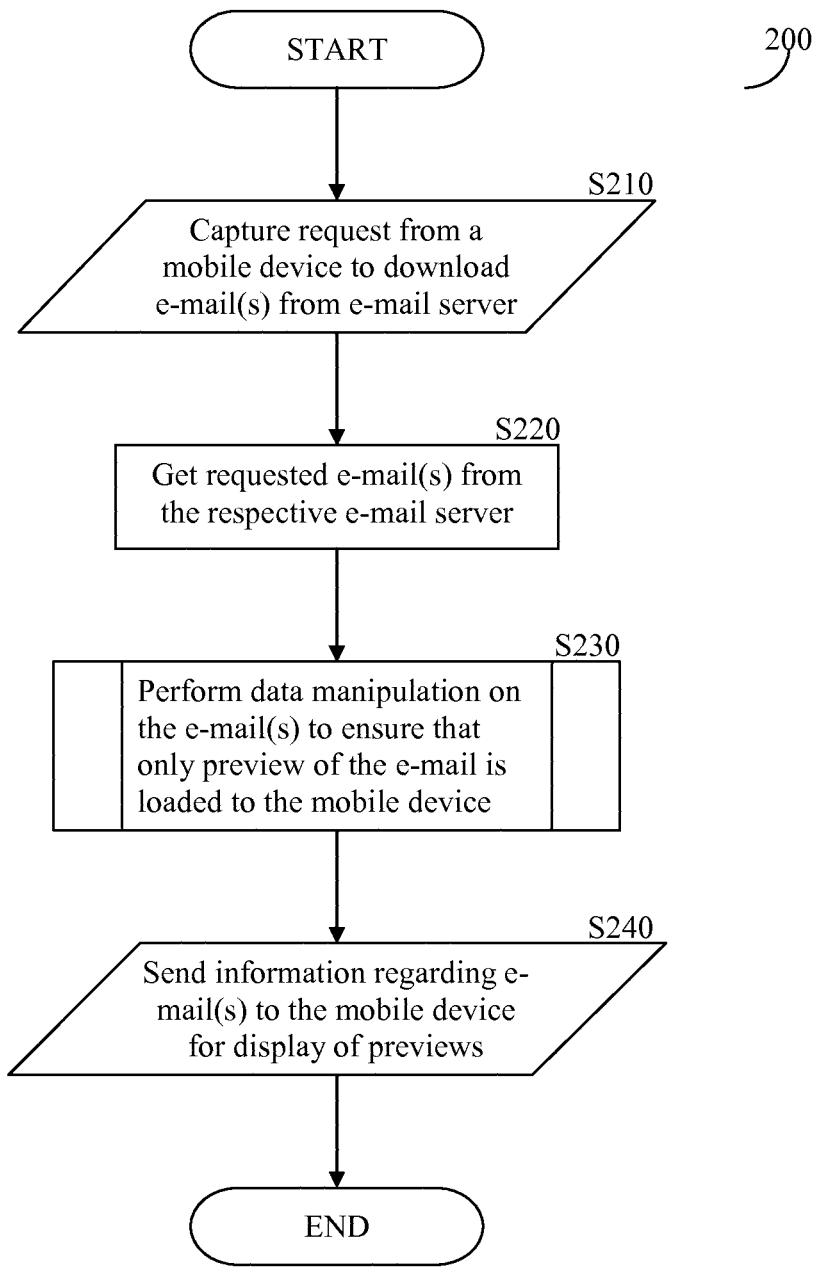
FIG. 2 is a flowchart describing the temporary expansion of an e-mail beyond a threshold value to cause the mobile device client not to download an e-mail.

FIG. 2 depicts an exemplary and non-limiting flowchart 200 describing the temporary expansion of a size of e-mail according to an embodiment of the invention. The temporary expansion of an e-mail beyond a threshold value causes the mobile device not to download an e-mail.

In S210, a request from a mobile device, for example, a mobile device 120-$i$, for providing of a received e-mail is captured by the network component 140. In S220, the network component 140 causes the delivery of the e-mails, if such exist, to the network components. In S230 the received e-mail (or e-mails, as the case may be) is processed in accordance with techniques further explained with respect of FIG. 3 herein below. What is performed is the temporary expansion of the e-mail to a level beyond a threshold used by the mobile device 120-$i$. This is performed because a mobile device's e-mail application, for example, but without limitation, Mail application of the Apple's iPhone, downloads e-mails that are below a threshold value to the mobile device, using in this case a threshold value of 128 KB. However, because today a lot of e-mail communication occurs that is below the threshold value, a large volume of e-mails that are of no interest to the user of the mobile device 120-$i$ are downloaded despite the desire of the user and who in turn has to pay for the consumed bandwidth. By causing the temporary expansion, the mobile device 120-$i$ is "fooled" to believe that a larger than actually present e-mail is available and therefore the e-mail is not downloaded. Instead, only information respective of the incoming e-mail or e-mails is shown to the user of the mobile device 120-$i$. If the user then selects to download the e-mail, then the e-mail with the original file's size is sent to the user. However, in most cases, users do not download to the mobile device such files and hence significant bandwidth savings occurs. In S240, the response is sent to the mobile device 120-*i* indicating the larger size of the e-mail which is therefore not downloaded to the mobile device as explained hereinabove.

Figure 3:
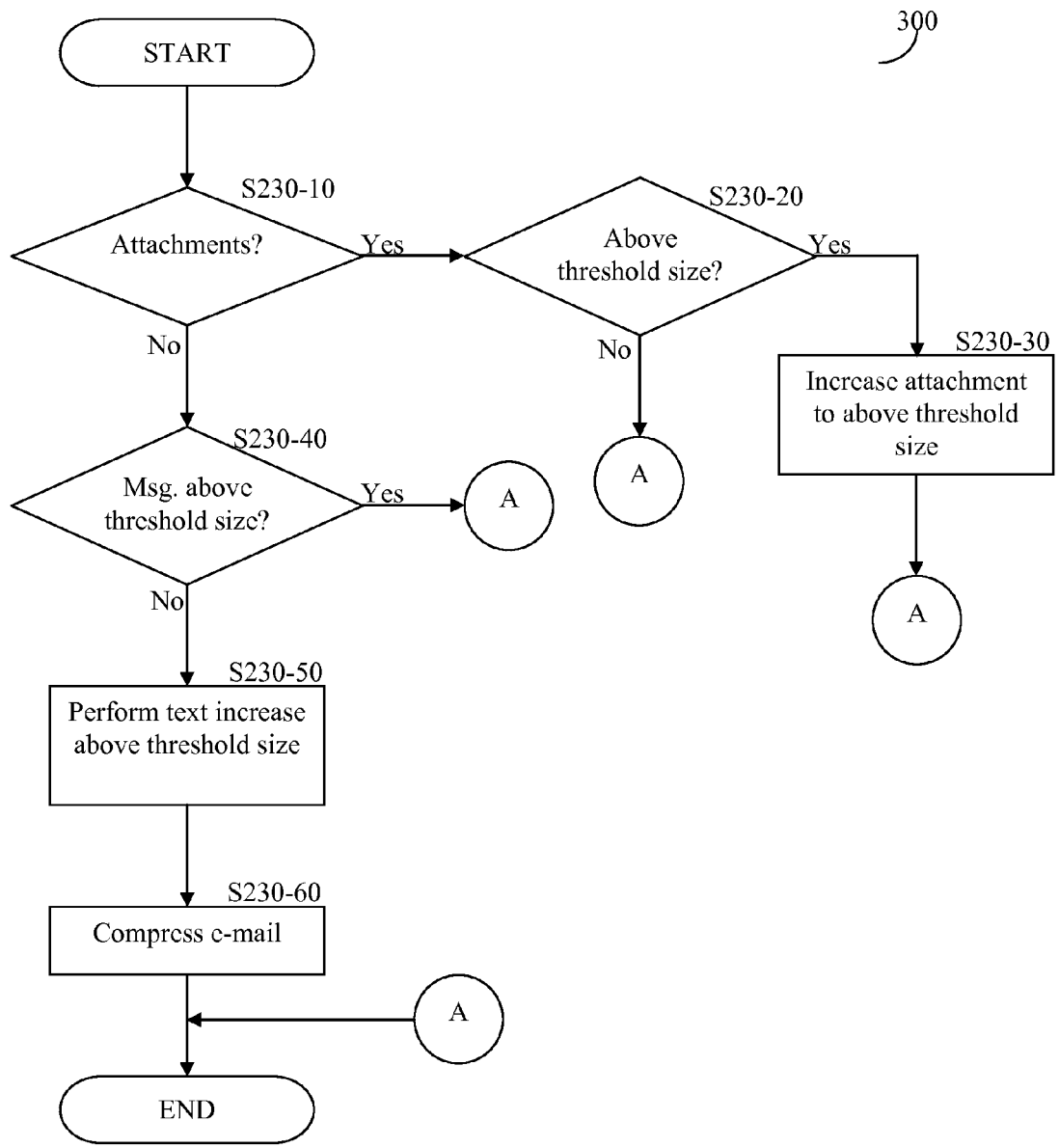
FIG. 3 is a flowchart describing the handling of file and text expansion of an e-mail in accordance with the principles of the invention.

FIG. 3 provides additional exemplary and non-limiting flowchart of S230 describing the handling of file and text expansion of an e-mail in accordance with an embodiment of the invention. In S230-10, it is checked whether there are files attached to the e-mail, and if so execution continues with S230-20; otherwise, execution continues with S230-40.

In S230-20, it is checked whether at least a file is above the threshold size set, for example, by the e-mail application of the target mobile device, and if not execution terminates (in this case it continues with S240 discussed with respect of FIG. 2 above; otherwise, execution continues with S230-30 where at least an attached file to the e-mail is expanded to a size beyond the threshold value of the mobile device 120-*i*, after which execution terminates.

In S230-40, it is checked if the text portion of the e-mail (i.e., text in the body and subject portions of the e-mail) is above the threshold value set by the e-mail application of the mobile device 120-*i*, and if so execution terminates; otherwise, execution continues with S230-50 where the size of the text is increased. In one embodiment of the invention, this is achieved by adding a combination of line breaks followed by a predefined number (e.g., 128K) of space characters. The line breaks ensure that a typical mobile device, when receiving the expanded e-mail, removes the empty lines at the end. In S230-60, a compression is used, such as, but not limited to, GZIP compression algorithm, to compress the text and because of the repetitive nature of the padding it is significantly reduced, therefore not impacting materially the download bandwidth when the user of the mobile device actually decides to receive the e-mail. It should be noted that the GZIP is typically used because it can be found as a standard on mobile devices. However, if the mobile device is a known device that supports another compression scheme, it can be used instead.

Hence, according to the solution described with respect of FIGS. 2 and 3 above, no e-mails are downloaded without a specific request of a user to actually download the e-mail after an opportunity to review a preview of the e-mail and make a conscious decision of the need to see it in full. By doing so the solution overcomes the prior art issues of downloading to the mobile device 120-*i* e-mails that usually the user of the mobile device 120-*i* would have preferred not to download and thereby save on bandwidth costs. In an embodiment of the invention, the user has the option to disable the solution by the mobile device, for example, when the user enters an area with a WLAN (Wi-Fi) connectivity and consumption of data bandwidth is not through the cellular network.

In accordance with one embodiment of the invention, the network component compares the size of the e-mails received for the user from the e-mail server side to the size of the e-mails actually provided to the mobile device in response to the mobile device request. The difference between the sizes is the bandwidth that the solution has saved for the user of the mobile device. It should be understood that teachings disclosed herein may apply to other applications respective of a native application executed by a mobile device without departing from the scope of the invention. Furthermore, it should be also understood that the teachings disclosed herein provide a solution that enables the prevention of a mobile device from downloading application content, for example, but without limitation, content corresponding to e-mail applications, based on its automatic settings and instead rather cause the application to accept only preview information that enables the user of the mobile device 120-*i* to make a judgment call as to whether to download the data in its entirety or not. A person skilled in the art should appreciate that the teachings discussed herein do not require the existence of a client on the mobile device and a mere setup is required to ensure the use of the network component instead of the direct communication between the mobile device and the e-mail server.

In yet another embodiment of the invention, it is desirable to reduce the size of a certain file that is sent to the mobile device as the display of such a device screen is typically a smaller screen that yields itself well to lower resolutions. For example, sending a high-resolution picture in an e-mail attachment to the mobile device may result in a significant cost to the user of the mobile device due to the use of a large amount of data. Therefore, it is desirable to send to the mobile device a resolution reduced or a highly compressed file, thereby significantly reducing the content downloaded to the mobile device. Assuming now that the user of the mobile device wishes to forward the file to another user, or otherwise reply to the e-mail. Then according conventional solutions, the recipient of the forwarded/replied e-mail receives the reduced quality image rather than the higher quality image that was actually sent to the user of the mobile device. If the recipient now receives the file in a system that lends itself for high resolution viewing the user's experience will be reduced significantly. Moreover, the file sent by the user of the mobile device is uploaded to the e-mail server thereby using additional bandwidth at an additional cost.

According to certain embodiments of the invention, the network component 140 when encountering this situation provides a compressed or resolution reduced file, as may be necessary, to the mobile device 120-*i*. However, rather than deleting the files from the network component 140, such files are maintained there for the user's future forwarding of the received e-mail to another user. Upon detecting such a request, it is not necessary to send the file from the mobile device 120-*i* to the network component 140, but rather the file is provided for the outbound e-mail from the memory of the network component 140, thereby saving additional bandwidth on outgoing messages. It should be noted that a document file (e.g., a Microsoft Word document file) sent by the mobile device 120-*i* cannot be prevented from being sent, but still it is a smaller amount of sent data. Reporting of such savings can be done in a similar way to the one described hereinabove.

The techniques described above can also be used to reduce the size of data when, for example and without limitation, a Microsoft Word document is sent to the mobile device. On the mobile device itself it may not be important to view all the fancy formatting of the Word document, i.e., formatting that may include font information, such as bold, italic, underlines, highlights, indentations, bullets, and so on and so forth. The size of the formatted document is typically significantly bigger in size than the unformatted document. Hence, the network component 140 may be enabled to strip out the document and send only the plain text to the mobile device, upon demand. However, when the e-mail needs to be forwarded or replied to, the document saved on the network component 140 is forwarded to the desired recipient rather than the reduced version sent to the mobile device 120-*i*.

In one embodiment of the invention, instead of implementing the saving of the attached files on the network component 140, the built-in feature of 'smart forward' or 'smart reply' are implemented on a typical e-mail server 130. Accordingly, when such a transaction is to take place the network component 140 uses the 'smart forward' or 'smart reply' options taking advantage of the properties of the e-mail servers 130 in order to save bandwidth for the mobile device 120-*i* without diminishing the experience of the recipient of the e-mail sent from the mobile device 120-*i*.

The embodiments disclosed herein may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate application, either generic or tailored for the purposes described in detail hereinabove.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A network component comprising:
    an interface to a network for communicating with at least an e-mail server and to at least one mobile device, wherein the network component is in a network path between the at least e-mail server and the at least one mobile device; and
    a processing unit for processing a request from the at least one mobile device to the at least e-mail server and causing each e-mail message received by the network component from the at least e-mail server to be viewed by the at least one mobile device as being of a size that is above a threshold value of the at least one mobile device, thereby providing to the at least one mobile device only preview information of each received e-mail message, thereby enabling a user of the at least one mobile device to determine whether to download the each received e-mail message to the at least one mobile device, wherein processing the request comprises determining whether at least an attachment to the each received e-mail message is above the threshold value and if not, expanding the attachment to be of a size that is larger than the threshold value, wherein the threshold value is determined by an e-mail application executed by the at least one mobile device.

2. The network component of claim 1, wherein the processing unit determines whether at least an attachment to the each received e-mail message is above the threshold value and if not, expanding the attachment to be of a size that is larger than the threshold value, wherein the threshold value is determined by an e-mail application executed by the at least one mobile device.

3. The network component of claim 1, wherein the processing unit determines whether at least a text portion of each received e-mail message is above the threshold value and if not, expands the text portion to be of a size that is larger than the threshold value, wherein the threshold value is determined by an e-mail application executed by the at least one mobile device.

4. The network component of claim 3, wherein the expanding the text portion is followed by compression of the expanded text of the each received e-mail message.

5. The network component of claim 4, wherein the compression is at least a GZIP compression.

6. The network component of claim 3, wherein expanding the text portion includes at least one of: adding line breaks; and adding space characters.

7. The network component of claim 1, wherein the network component is at least one of: a proxy server, a virtual private network (VPN) server, a traffic shaper, a router, and a network address translator (NAT).

* * * * *